Figure 1:
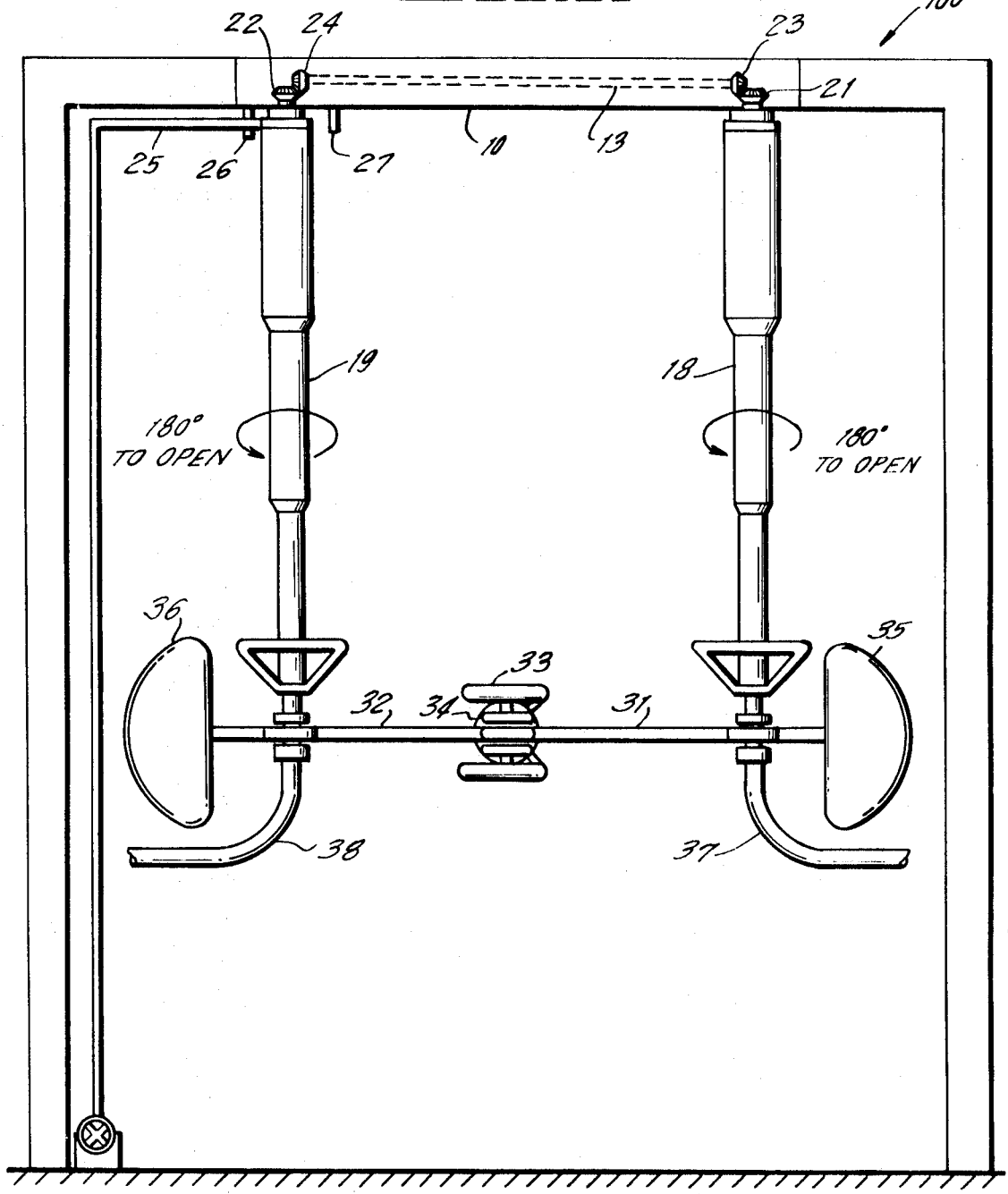

United States Patent

[11] 3,601,663

| [72] | Inventor | Roy H. Albright<br>Greensburg, Pa. |
|---|---|---|
| [21] | Appl. No. | 864,016 |
| [22] | Filed | Oct. 6, 1969 |
| [45] | Patented | Aug. 24, 1971 |
| [73] | Assignee | I-T-E Imperial Corporation<br>Philadelphia, Pa. |

[54] INSULATOR MOUNTING IN A HIGH POWER ELECTRICAL DISTRIBUTION SYSTEM
7 Claims, 4 Drawing Figs.

[52] U.S. Cl. .................................................. 317/103, 174/45, 200/48 R
[51] Int. Cl. .................................................. H02b 1/04, H01h 33/24
[50] Field of Search .......................................... 174/43, 45; 200/48 R, 48 CB, 48 P; 317/103

[56] References Cited
UNITED STATES PATENTS

| 3,493,699 | 2/1970 | Turgeon | 200/48 CB |
| 2,084,885 | 6/1937 | Biermanns | 200/148 |
| 2,432,263 | 12/1947 | Turner | 200/48 X |
| 2,606,952 | 8/1952 | Cofer | 174/43 |

FOREIGN PATENTS

| 751,851 | 7/1956 | Great Britain | 317/103 |

Primary Examiner—Lewis H. Myers
Assistant Examiner—Gerald P. Tolin
Attorney—Ostrolenk, Faber, Gerb & Soffen ABSTRACT: A high power electrical distribution system wherein insulator stacks are mounted in an inverted, underhung position rather than in an upright position to support switches and/or buses. An inverted or underhung mounting provides greater dielectric characteristics than a mounting of insulator stacks in a conventional upright manner, and permits a reduction in the required insulator height for a given voltage application.

INVENTOR.
ROY H. ALBRIGHT
BY Ostrolenk, Faber, Gerb & Soffen
ATTORNEYS

INSULATOR MOUNTING IN A HIGH POWER ELECTRICAL DISTRIBUTION SYSTEM

BACKGROUND OF THE INVENTION

This invention relates to electrical power transmission and distribution systems and, more particularly, to a novel arrangement for mounting the insulator stacks employed therein.

With the growth of the electrical power industry, the transmission voltages supplied have increased from modest values of 5 to 15 kilovolts to the present high levels of 500 to 750 kilovolts. As further growth in the industry occurs it is anticipated that transmission voltages will be extended into a range from 1000 to 1500 kilovolts. The formidable factor in the design of higher voltage systems is the provision for sufficiently high insulation strength.

With the successful application of surge control in power circuit breakers and advances in surge diverter design, switching surges can be limited to a sufficiently low level that operating voltages can be increased to 1000–1500 kilovolts with no greater probability of flashover than on the present 750 kilovolt systems. These 750 kilovolt systems have a switching surge insulation strength or withstand of 1350 kilovolts, impulse withstand of 2100 kilovolts, power frequency withstand of 970 kilovolts, and with no visible corona at 500 kilovolts to ground. Future 1500 kilovolt systems may require a switching surge withstand or insulation strength of 2300 kilovolts, impulse withstand of 2600 kilovolts, power frequency withstand of 2000 kilovolts, and with no visible corona at 1300 kilovolts to ground.

In recent times, power systems have been developed using voltages as high as 765 kilovolts. These systems require, for example, disconnecting switches having insulator columns with great withstand during operation. The insulator columns must be of the order of 20 feet or so in order to provide adequate withstand for the switching surges involved. Under these conditions, the switch-open gap using existing switch blade arrangements had to be considerably longer (e.g., 25–30 feet) to insure that flashover would be across the insulator columns rather than across the open gap. By means of inventions disclosed in applications Ser. No. 681,743, filed Nov. 9, 1967, (now U.S. Pat. No. 3,493,699, issued Feb. 3, 1970) and Ser. No. 839,456 filed July 7, 1969, the switch open gap could be reduced to between 4 and 6 feet, on the one hand, and between 6 and 7 feet, on the other hand, while, at the same time, insuring no flashover in the open gap position.

During the period that the operating voltage supplied by the distribution system has increased to its present high level of 765 kilovolts, the insulators used with air isolating switches and bus supports have undergone some change to improve their mechanical and electrical characteristics. In addition, the height of the insulator stacks have also been increased to meet the increased dielectric requirements necessitated by the higher operating voltages. However, increases in that height—which has already approached 20 feet for a 765 kilovolt system—have increasingly subjected the slender insulating columns to ever greater deflections at nominal loads. It will be readily apparent that the permissible deflection of ever taller insulator stacks as might normally be considered for higher voltages is not unlimited, and a limit to insulator height may soon be reached if only to maintain the rigidity of the stack arrangement employed.

It is an object of the present invention, therefore, to provide an electrical power distribution system which permits the dielectric requirements of an insulator column to be increased to accommodate higher operating voltages while at the same time maintaining some degree of control over the total height of the insulator stacks.

It is another object of the invention to provide such a system in which flashover for the insulator column would occur at a voltage higher than presently obtainable with known insulator constructions in common use.

It is a further object of the invention to provide such a power distribution system which provides for a reduction in the height of an insulator column for a given voltage application.

As will become clear hereinafter, such an electrical power distribution system employs an insulator stack mounted in an inverted or underhung position, rather than mounted in a conventional upright manner. Employing insulator columns in such an underhang position is not, per se, new in and of itself as such configurations have been known in substation design for matters of convenience and simplicity. This is especially true in the lower voltage ratings. On the other hand, very few insulator stacks are mounted in the underhung position for voltage ratings above 125 kilovolts or so. None of these underhung mountings, furthermore, have been employed to provide added dielectric strength so as to enable operation at increased higher voltages.

Figure 2:
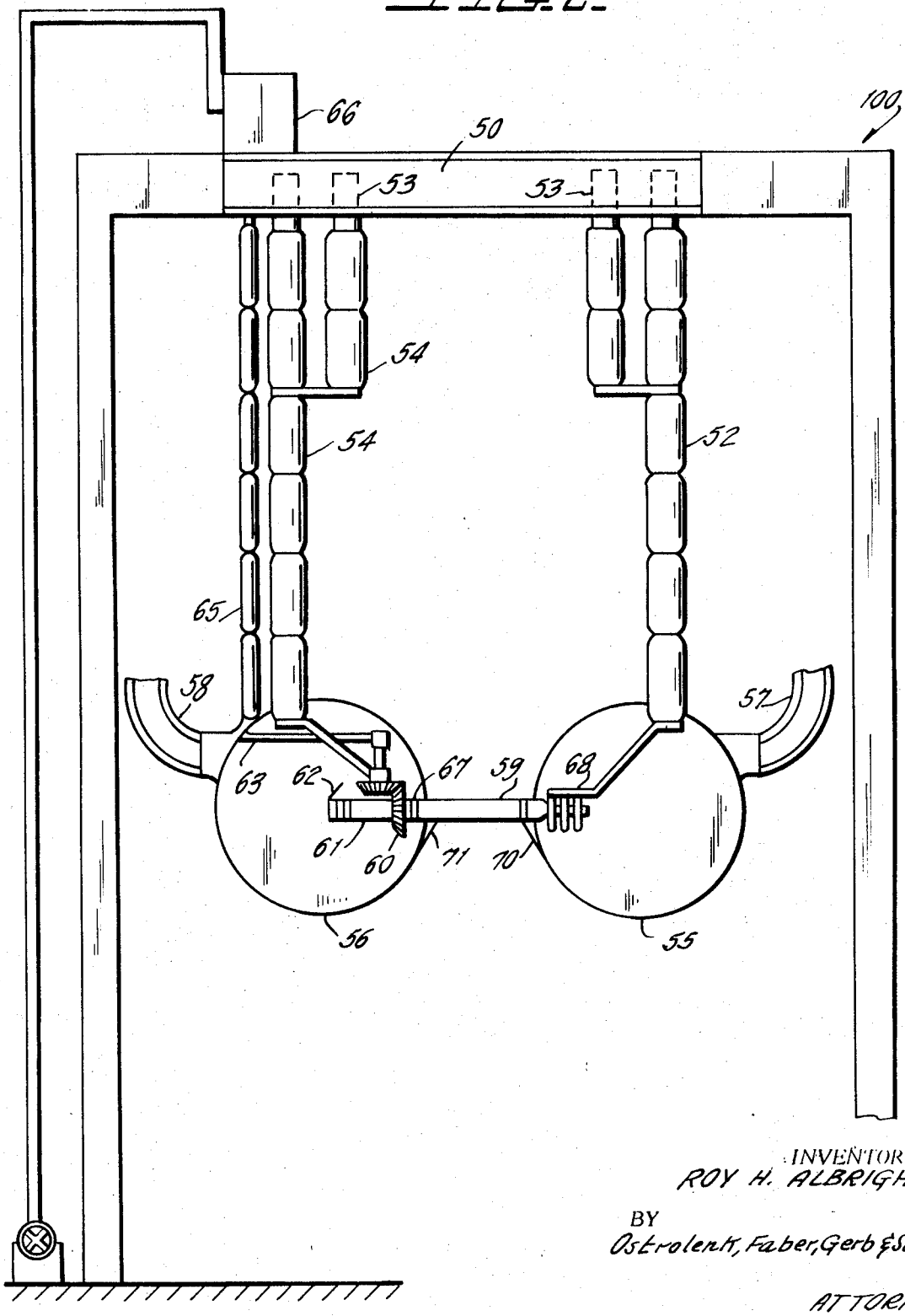
Figure 3:
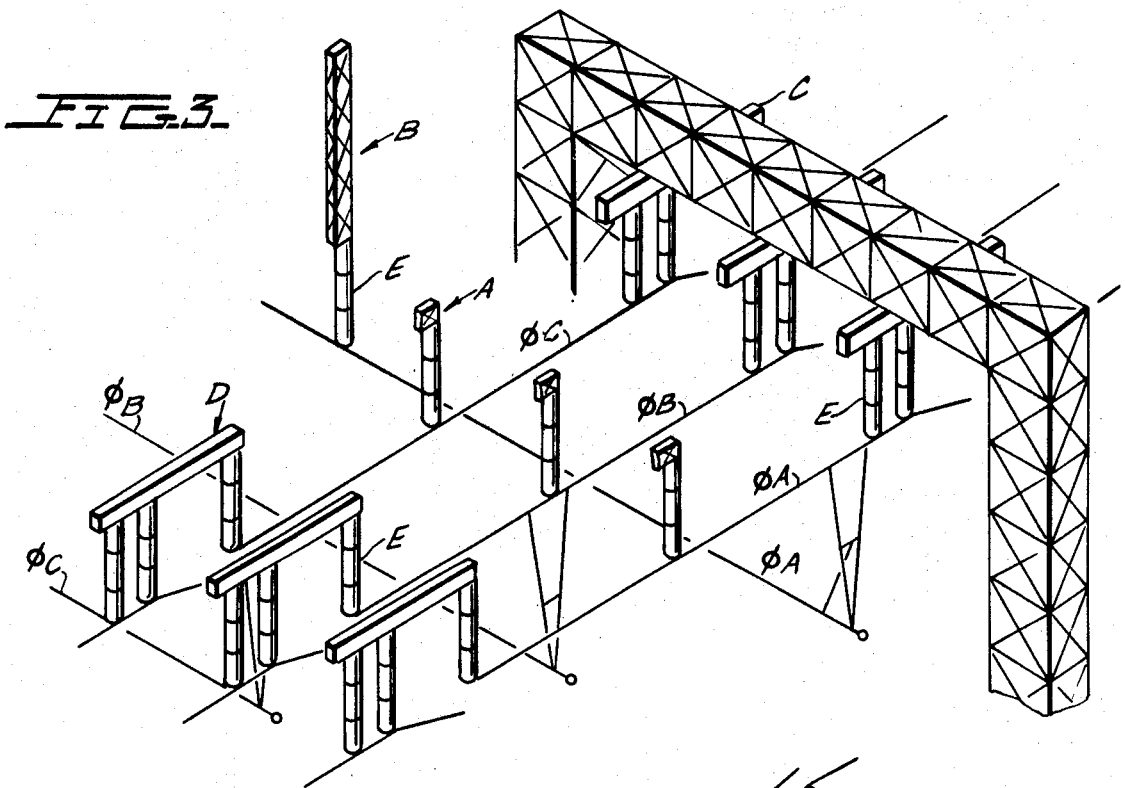
Figure 4:
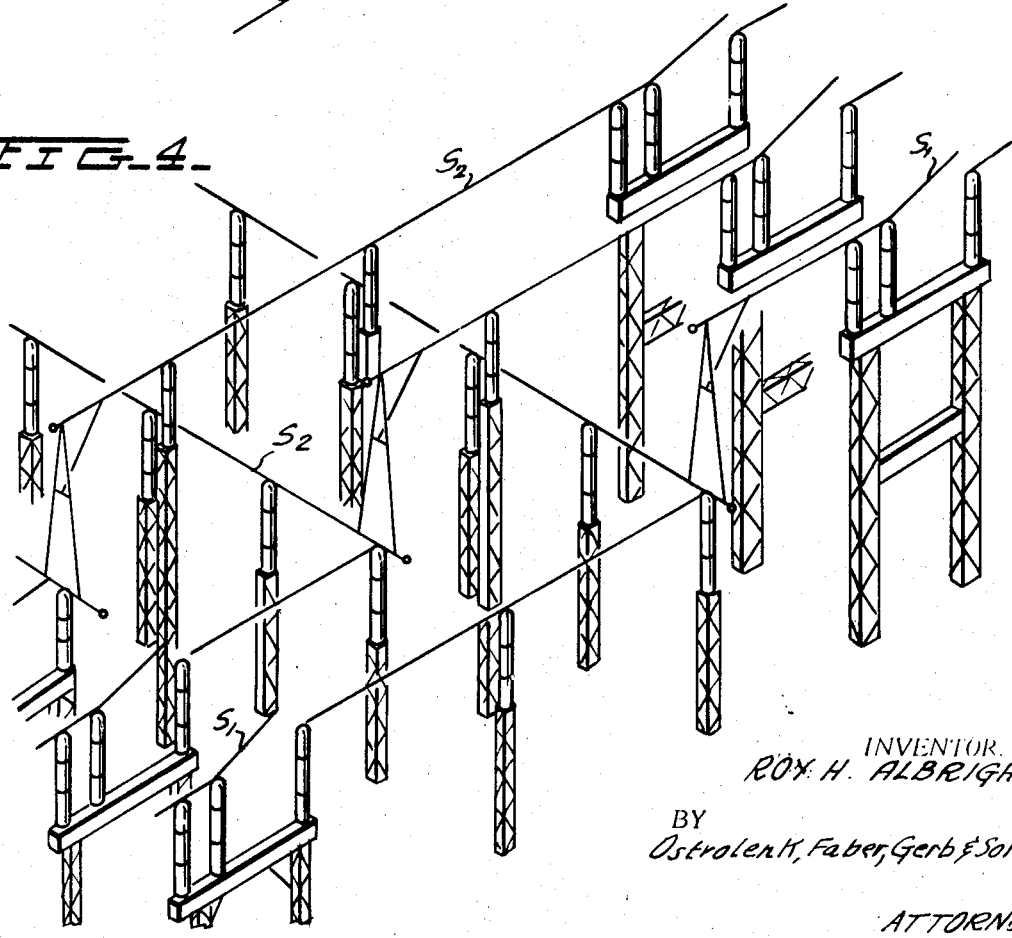

These and other objects of the present invention will be more fully understood from the following description taken in conjunction with the accompanying drawings, in which:

FIG. 1 is an elevational view of one embodiment of the invention as it might be employed with a center break two-insulator disconnect switch of the type disclosed in copending application Ser. No. 681,743 filed Nov. 9, 1967, (now U.S. Pat. No. 3,493,699,);

FIG. 2 is an elevational view of an embodiment of the invention as it might be employed with the disconnect switch disclosed in application Ser. No. 839,456, filed July 7, 1969; and FIGS. 3 and 4 are isometric views schematically showing another possible embodiment of the invention and its corresponding prior art arrangement, respectively.

DESCRIPTION AND OPERATION OF THE ARRANGEMENT OF FIG. 1

Basic to the invention disclosed herein is the recognition that the highest dielectric stress in an insulator column exists in the area of the energized parts, and that this stress results from the capacitance existing between the energized parts and the physical ground plane which is infinitely large. When mounted in a conventional upright position to support disconnect switches or buses, the insulator column experiences a congestion of the electrostatic field on its porcelain surfaces which are adjacent to the energized parts. Breakdown of the surrounding dielectric medium (e.g., air) occurs in this arrangement, and initiates a discharge to ground.

When mounted in an inverted, underhung position, it will be apparent that the insulator stacks must, of necessity, be supported from some overhead structure or suspension frame. In such a configuration, the capacitance which is present exists both between the energized parts and the physical ground plane (as before), as well as between the energized parts and the overhead ground. However, due to the small surface area of the overhead structure, the capacitance that is present is less when measured from the energized part to the overhead ground than that comparably measured to the physical ground plane. At the same time, the distribution of the electrostatic field is such that the field is not nearly as congested on the porcelain surface adjacent to the energized parts when measured in this manner. As a result, it has been found that for a given height of insulator stack, the stack will withstand a higher voltage when mounted in this inverted, underhung position than when it is mounted in an upright position.

Referring now to FIG. 1, there is shown a center break two-insulator disconnect switch assembly of the type disclosed in copending application Ser. No. 681,743, filed Nov. 9, 1967, (now U.S. Pat. No. 3,493,699). As shown, the center break disconnect switch comprises a switch base 10 which is preferably part of a rigid metallic suspension frame structure 100. The switch base 10 is provided with a channel for housing a rotatable link 13. The switch base 10 is also provided with two pairs of concentric cylindrical holes (not shown) which engage the upper portion of the insulator columns 18 and 19 such that the columns may be rotated within those holes. As will be readily apparent, the insulator columns 18 and 19 are mounted in an inverted, underhung position as compared to the conventional upright position, an example of which is actually shown in FIGS. 1 and 2 of application Ser. No. 681,743 (now U.S. Pat. No. 3,493,699).

Insulator columns 18 and 19 have gears 21 and 22, respectively, at their upper ends. These gears fit into the concentric holes to engage further gears 23 and 24, respectively, provided on the rotatable link 13. The insulator column 19 also has an operating crank arm 25 rigidly connected to it and oriented so as to be operative from ground level. Crank arm 25 is rotatable between two positions as defined by stop 26 and 27. At their lower ends, insulator columns 18 and 19 are rigidly connected to a pair of switch blades or contact arms 31 and 32 in any suitable manner. It is noted that the base 10 and insulator columns 18 and 19 may have any suitable arrangement whereby the insulator columns are rotatable, such as the arrangement shown in U.S. Pat. No. 3,235,698, assigned to the assignee of the instant invention.

Switch blades 31 and 32 are made of suitable conductive material and have contacts 33 and 34, respectively, on one end thereof. The contacts may be of any suitable structure, such as shown in the above mentioned U.S. Pat. No. 3,235,698. The switch blades 31 and 32 may also have spherical electrodes 35 and 36 respectively connected on their ends opposite the contacts. The switch blades 31 and 32 are pivotally connected to conductors 37 and 38 which carry the system voltage along their respective lengths in any suitable manner. Though spherical electrodes have been shown, the electrodes may also be toroidal shaped rings, as described in application Ser. No. 681,743 application, (now U.S. Pat. No. 3,493,699).

The operation of the disconnect switch and the inverted insulator environment is much the same as that described in the aforementioned pending application. When the switch is closed, the jaw-type contact finger arrangement of contact 33 is held in proper engagement with contact 34 by means of operating crank arm 25 being moved to the position against stop 26. If for some reason the switch must be disconnected—such as for maintenance, repair or inspection—the crank arm 25 is rotated 180° from its position against stop 26 to a position against stop 27.

The rotation of crank arm 25 causes the rotation of insulator column 19. Rotation of column 19 causes its gear 22 (which is in engagement with gear 24 of link 13) to rotate link 13. This rotation of link 13 results in the rotation of its gear 23, and this, in turn, rotates insulator column 18 through its engagement with gear 21.

It is therefore seen that rotation of crank arm 25 for disengagement simultaneously rotates switch blades 31 and 32 into a position whereby the spherical electrodes 35 and 36 face each other with substantially smooth surfaces to produce a sphere gap between the switch blades. This sphere gap, as described in detail in application Ser. No. 681,743 application (now U.S. Pat. No. 3,493,699), results in the production of a substantially uniform dispersed electrostatic field in the switch open gap, and requires a much higher voltage for flashover across the gap than that for a rod gap of the same spacing.

In one test of an arrangement of the type set forth in FIG. 1, the disconnect switch was positioned some 16 feet above ground and an insulator height of some 20 feet was employed. For a 765 kilovolt application, it was found that the arrangement would not flashover at 1800 kilovolts. However, an insulator column mounted in an upright position of comparable dimension flashed over at about 1550 kilovolts. An improvement of at least 15 percent in dielectric characteristics was thus realized for the inverted underhung arrangement.

DESCRIPTION AND OPERATION OF THE ARRANGEMENT OF FIG. 2

Referring now to FIG. 2, there is shown an embodiment of the invention with a two-insulator disconnect switch assembly of the type disclosed in application Ser. No. 839,456, filed July 7, 1969. As with the arrangement of FIG. 1, the disconnect switch is comprised of a switch base 50 preferably part of a rigid metallic suspension frame structure 100. The switch base 50 is here provided with means 53 which secure the upper portions of the insulator columns 52, 54 in any desirable manner, such that the insulator columns 52, 54 are held stationary with respect to base 50.

The opposite ends of the insulator columns 52, 54 cooperate to support a pair of metallic electrodes and a retractable switch blade constructed in the manner described in application Ser. No. 839,456. In particular, the insulator columns 52, 54 rigidly support a pair of spherical electrodes 55, 56, each of which has an opening in that portion of its surface nearest to the other spherical electrode. In one construction, the spherical electrodes might be 6 feet 6 inches in diameter and spaced apart a distance of 7 feet.

Conductors 57 and 58 are respectively coupled to the spherical electrodes 55 and 56 in this environment in any suitable manner and connect these electrodes to suitable utilization apparatus (not shown). It is to be noted that while solid spherical electrodes have been shown, the electrodes 55 and 56 may also be toroidal shaped rings, ellipsoids or spheroids provided with substantially smooth surfaces which confronts one another in the position of the air gap.

The retractable switch blade 59 for alternately closing and opening the disconnect switch is shown as being in alignment with the plane formed by the openings in the two spherical electrodes 55, 56. This blade is operated to slide within the openings and to make electrical contact between the two spherical electrodes when the switch is desired to be closed. When the switch is to be opened, the blade 59 is arranged to wholly retract within the spherical electrode 56. In that instance, the near surfaces of the spherical electrodes 55 and 56 will present the above described air gap of a nature which establishes a uniform electrostatic field. The 7 foot gap resulting between these spherical electrodes 55 and 56 will suffice to minimize the possibility of flashover, as described in application Ser. No. 839,456, whereas a rod-type gap of previous design would require a spacing of 27 feet and more to prevent against flashover for comparable ultrahigh kilovolt voltages.

Retraction of the blade 59 within the spherical electrode 56—and conversely its movement to connect to the spherical electrode 55—is controlled by the rotation of a gear 60 on a threaded portion 61 located within the spherical electrode 56. More particularly, the gear 60 is driven by a gear 62 through a conventional chain drive 63 by a rotating stack 65. In this respect, it will also be noted that the gear 62 and the chain drive 63 are also included within the confines of the spherical electrode 56. A motorized gearbox 66 is also shown as providing the rotational drive for the stack 65. Both these latter components, namely the stack 65 and the gear box 66, are located external to the electrode 56 but are held in secure relationship thereto.

The closing stroke of the retractable blade 59 effectively drives the blade 59 into the opening of the spherical electrode 55. At the end of the closing stroke directed by the gearbox 66, the blade 59 is rotated by a cam 67 to fit within the contact fingers of a jaw 68 located within the latter electrode 55. It will be noted that whereas the cam 67 is positioned within the spherical electrode 56, the jaw 68 is located within the spherical electrode 55 and serves to obtain a high pressure contact when the disconnect switch is in its closed position.

If for some reason the switch must be disconnected—such as for maintenance, repair or inspection—the motorized gearbox 66 operates the rotating stack 65, the chain drive 63, the gears 60 and 62 and the cam 67 in the direction to withdraw the retractable blade 59 from jaw 68 so as to move to an open position wholly within the confines of the spherical electrode 56. In this respect, it will be understood that the length of the retractable blade 59 is sufficient to make contact between the gears of the spherical electrode 56 and the jaw 68, while at the same time being short enough so as not to protrude beyond the surface of the electrode 56 when the blade is completely withdrawn from jaw 68. It will be seen that this can be effected when employing a retractable switch blade 59 having a longitudinal dimension greater than the airgap distance but less than the diameter of the spherical electrode 56 measured along an axis substantially parallel to the direction of switch blade movement.

While the invention of the instant application has thus far been described in an environment in which the inverted, underhung insulator stacks support unique air isolation switches, it will be appreciated that the teachings of the invention are not limited to supporting only such arrangements. As will be readily apparent, similar bus sections and conventional blade switches may be likewise supported, and the advantages ensuing from the invention will be obtainable thereto.

Thus, FIG. 3 illustrates a substation arrangement in which all switch and bus support insulators are shown in underhung position to improve the dielectric characteristics of the insulator stacks. In this drawing, conventional blade switches C are shown as being mounted by columns and an overhead truss. Similar columns and trusses are also employed for clarity. Bus supports A, in this regard, are intended to support phase conductors on the upper level and, therefore, have small bases. Bus supports B, on the other hand, are intended to support phase conductors at the lower level and require long structural supports to connect to the underside of the overhead truss. Notation E in this figure designates the underhung insulator.

FIG. 4 sows the corresponding substation arrangement according to the prior art wherein the switches $S_1$ and bus supports $S_2$ are mounted on columns set at ground level.

With any of the constructions of FIGS. 1-3, the insulator heights required in a given structure for a predetermined voltage application will be reduced as compared to the heights required for insulator arrangements of the conventional upright mounting. Stated another way, the construction of the present invention enables increasingly higher voltage applications without increasing the overall height of insulator stacks as are presently configured. In other words, power distribution systems having much higher operating voltages can be employed without requiring any appreciable heightening of the insulator stacks for the switch or bus supports. This significantly reduces any problems that may arise resulting from increased deflection and instability of increasingly heightened insulator stacks necessitated by such voltage increases when operating with present insulator configuration designs.

The embodiments of the invention in which an exclusive privilege or property is claimed are defined as follows:

1. In an outdoor electrical power distribution system, apparatus comprising:
   conductor means for carrying voltages of the order of hundreds of kilovolts and more along the length thereof;
   insulator supports each having an upper and a lower end, said lower end supporting said conductor means at a predetermined position along the length of said conductor means;
   a grounded metallic suspension frame; said insulator supports, said conductors and said frame being completely exposed to the atmosphere; and
   means mounting second ends of said insulator supports to the underside of said suspension frame for suspending said supports in inverted, underhung arrangements while upholding said conductor means;
   corona shield means positioned at the lower end of each insulator and adjacent said conductor means whereby increases in dielectric characteristics of said insulator supports are exhibited as compared to mounting said insulator supports to uphold said conductor means in an upright arrangement.

2. Apparatus as defined in claim 1, wherein said suspension frame is physically grounded and wherein said mounting means establishes an exhibited capacitance between said conductor means and said suspension frame which is substantially less than the exhibited capacitance between said conductor means and said physical ground.

3. Apparatus as defined in claim 2, wherein said conductor means includes an electrical bus.

4. Apparatus as defined in claim 2, wherein said conductor means includes an air isolating switch.

5. Apparatus as defined in claim 4, wherein said air isolating switch comprises said corona shield means wherein said shield means comprises conductive members presenting substantially smooth surfaces facing one another when in an electrically disengaged position.

6. Apparatus as defined in claim 5, wherein said isolating switch includes first and second switch blades mounted on said insulator supports and wherein means are further included connected to said insulating supports for rotating said supports between a first and second position, whereby first and second contacts on said switch blades are respectively engaged in said first position and whereby said contacts are disengaged in said second position.

7. Apparatus as defined in claim 5, wherein said conductive members are mounted on said insulator supports, and wherein said isolating switch includes a retractable switch blade and means operable to move said switch blade between said conductors through surface openings thereon to contact said conductors when in an engaged switch position and to withdraw said retractable switch blade within at least one of said two conductors when in said disengaged position.